COMPACT MULTIPLE EFFECT STILL HAVING STACKED IMPERVIOUS AND PERVIOUS MEMBRANES

Original Filed May 26, 1966 5 Sheets-Sheet 1

United States Patent Office

Re. 27,982
Reissued Apr. 23, 1974

27,982

COMPACT MULTIPLE EFFECT STILL HAVING STACKED IMPERVIOUS AND PERVIOUS MEMBRANES

Franklin A. Rodgers, Brookline, Mass., assignor to Pactide Corporation, Cambridge, Mass.

Original No. 3,497,423, dated Feb. 24, 1970, Ser. No. 553,190, May 26, 1966, which is a continuation-in-part of application Ser. No. 510,014, Nov. 26, 1965, now Patent No. 3,406,096. Application for reissue Nov. 8, 1971, Ser. No. 196,703

Int. Cl. B01d *3/02;* C02b *1/06*

U.S. Cl. 202—174 8 Claims

Matter enclosed in heavy brackets [ ] appears in the original patent but forms no part of this reissue specification; matter printed in italics indicates the additions made by reissue.

ABSTRACT OF THE DISCLOSURE

The compact, multiple effect still is composed of alternating layers in stacked relationship of thin porous membranes that are impervious to liquids while readily passing the vapors thereof and corrugated membranes that are impervious to liquids and vapors.

This application is a continuation-in-part of copending U.S. application Ser. No. 510,014, filed Nov. 26, 1965, now U.S. Patent No. 3,406,096.

This invention relates to novel and improved distillation apparatus for transferring liquid directly from one body of liquid to another across a vapor permeable barrier.

In the copending U.S. patent application of Franklin A. Rodgers, Ser. No. 456,404, filed May 7, 1965, now abandoned, there is described distillation apparatus particularly adapted for the desalination of water and including as the basic components thereof, a porous membrane that operates as a barrier to liquids while readily passing the vapors of the liquids, means for forming thin evaporating and condensing layers [or membranes] of the liquids in contact with opposite sides of the porous membrane, and means for transferring heat to the evaporating layer and from the condensing layer. The porous membrane includes a multiplicity of microscopic, gas-filled, through passages having walls non-wettable by the liquid for passing substantially only the vapor of the liquid and gases dissolved therein from the evaporating layer to the condensing layer. The porous membrane and the means for forming the evaporating and condensing layers preferably constitute one liquid transfer stage of a multiple stage still in which adjacent condensing and evaporating layers of adjacent stages are separated by liquid and vapor impermeable barriers, and heat is transferred from the condensing layer of each stage to the evaporating layer of the next succeeding stage.

Objects of the invention are: to provide multiple stage distillation apparatus of the type described having a novel, improved and less expensive construction that facilitates fabrication and assembly of the multiple stage apparatus and provides for more efficient operation; and to provide, in multiple stage distillation apparatus as described comprising a plurality of porous and impermeable barrier membranes sandwiched together, an improved barrier membrane configuration providing [fo] *for* improved liquid flow characteristics.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
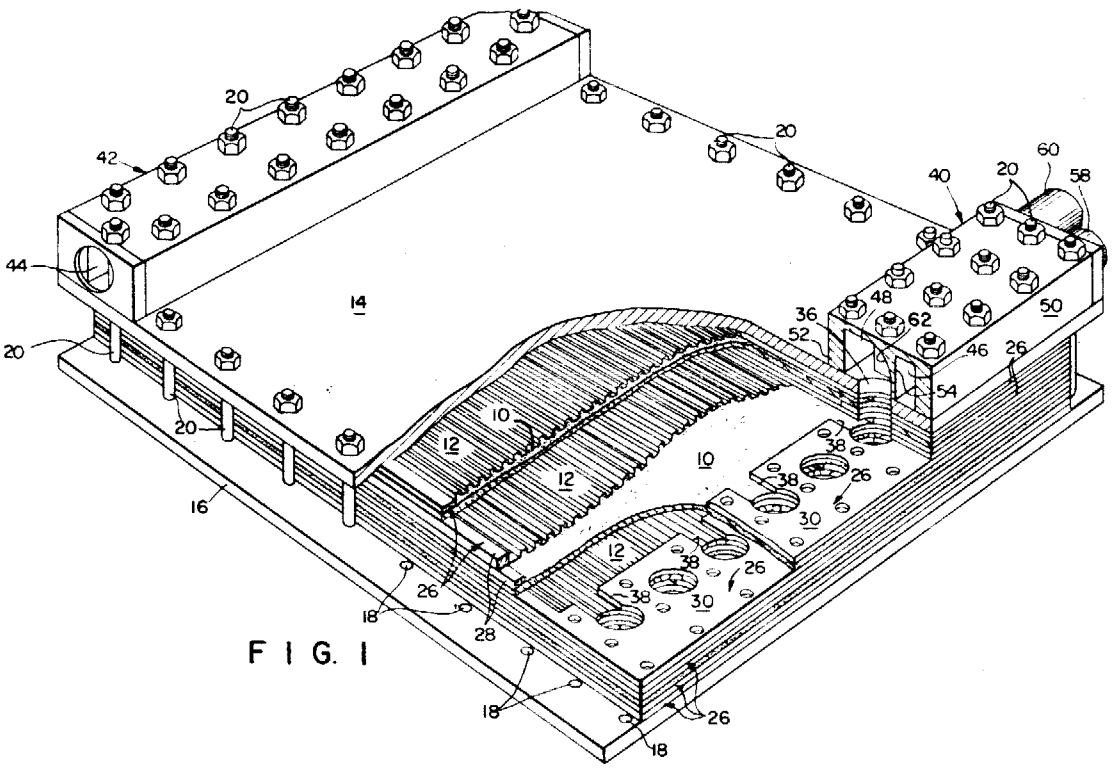
FIGURE 1 is a perspective view, partially in section, showing distillation apparatus embodying the present invention, with the thickness of components exaggerated for purposes of illustration.

The present invention is incorporated in an inexpensive yet highly efficient, compact, multiple effect still made possible largely by the provision of thin porous membranes that are impervious to liquids while readily passing the vapors thereof. The basic components of the still including a multiplicity of such porous membranes arranged in stacked contiguous relation together with vapor and liquid impervious membranes disposed between the porous membranes to separate the condensing layer (liquid) of each stage from the evaporating layer of the next succeeding stage. Both the porous and impervious membranes are quite thin as are the liquid layers confined therebetween so that a large number of distillation stages can be embodied in a relatively small assembly, and the membranes are preferably formed of materials, particularly organic plastics, that are inexpensive and easy to fabricate.

As previously noted, the basic components of an individual distillation stage are a porous membrane and an impervious membrane for forming and maintaining the liquid evaporating and condensing layers. The porous membrane is substantially as described in the aforementioned application and comprises a thin sheet material formed with a multiplicity of microscopic through pores or passages of substantially uniform size, and occupying the major portion (e.g. 80–85%) of the total volume of the membrane. The porous membrane is designed to permit operation of the still with the films or layers of evaporating and condensing liquids in direct contact with the surfaces of the porous membrane and with the liquids at hydrostatic pressures equal to or greater than the pressures of the other portions of the system, particularly the gas within the pores of the membrane. To make this operating condition possible while reducing to a minimum the resistance to diffusion of vapor, the pores are preferably of a maximum size while being so constituted as to be unable to pass the liquid, and the apparatus is operated under conditions such that the pores contain only the vapor of the liquid and any gas dissolved therein substantially at the vapor pressure of the liquid (and any dissolved gas).

Materials useful for the porous membrane include organic plastics that are insoluble in and compatible with the particular vaporizable liquid (e.g. water) to be purified by the distillation apparatus, and able to withstand the operating temperatures encountered. Materials useful for the porous membrane in stills designed to desalinate water, include, for example, polyvinyl chloride, cellulose nitrate, cellulose acetate, cellulose triacetate, nylon, and polytetrafluoroethylene. The porous plastic membrane may be inherently non-wettable by the liquid and/or it may be treated in such a way as to render the surfaces including the pores, non-wetting. For example, a cellulose nitrate microscopic porous filter media, such as sold by Millipore Filter Corporation under the trademark "Standard MF" and having a thickness of approximately 0.006 inch and pores with an effective diameter of 0.45 micron, may be coated with a silicone water repellant such as sold by General Electric Company under the trade name "Dri-film" No. 1040 or No. 1042, or designated SS 4029, to provide a non-wetting porous membrane suitable for incorporation in the still of the invention.

In a multiple effect or multiple stage still, liquid and vapor impermeable barrier [membrances] *membranes* are alternated with porous membranes to form, maintain and separate the evaporating and condensing layers [of] *or* sheets of liquid as well as to provide a good thermal conduction for promoting heat-transfer from the condensing layer of each stage to the evaporating layer of the next succeeding stage. The impermeable barrier membranes are formed of the thinnest possible sheet material in order to reduce resistance to heat transfer to a minimum, particularly in stages of the apparatus at which the operating temperature is relatively low and thermal conductivity may constitute a major factor in overall operating efficiency. The composition of the impermeable barrier membrane depends primarily on the nature of the particular liquids involved including compatibility of the membrane with the liquids, the operating temperature of the apparatus, cost, ease of fabrication and assembly, and thermal conductivity. Suitable materials include metals such as copper and aluminum having good thermal conductivity and available in sheet form, and less expensive materials, particularly organic plastics, having the requisite structural strength at the operating conditions of temperature and pressure. Sheet materials particularly suitable as impervious membranes useful in stills designed to desalinate water include fluorocarbons such as polyvinylidene fluoride, and polycarbonates, desirable because of their superior dimensional and chemical stability under conditions of 100% humidity and high temperature and resistance to damage from biological growth.

Figure 2:
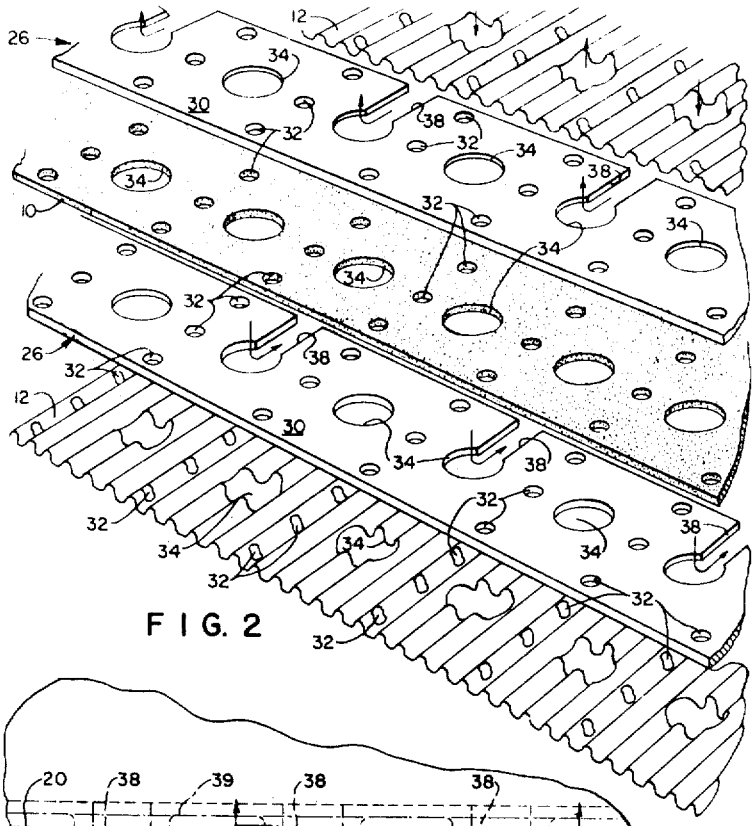
FIG. 2 is a fragmentary, exploded, perspective view of components of the apparatus of FIG. 1, shown with some of the dimensions, primarily thickness, exaggerated.
Figure 3:
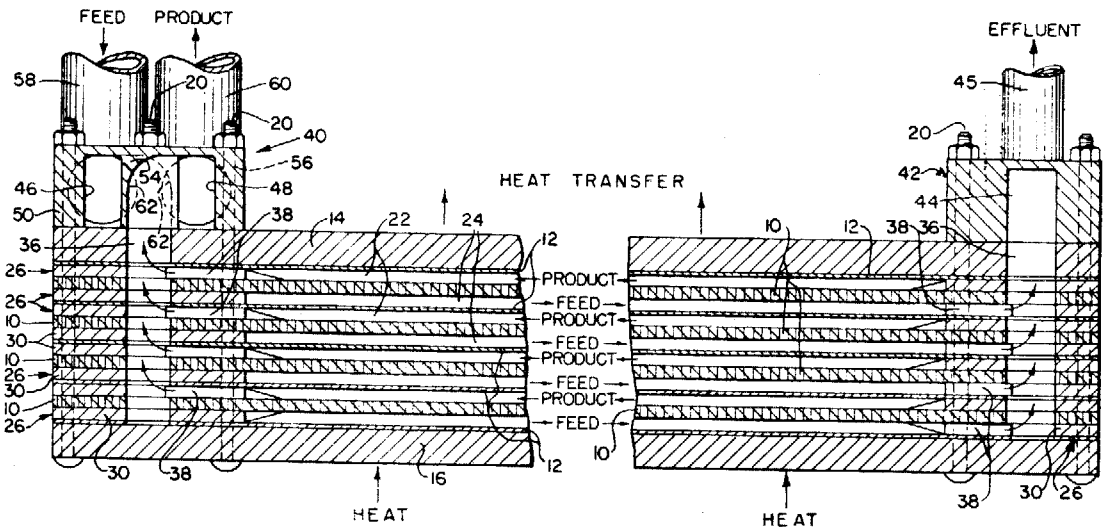
FIG. 3 is a sectional view of the apparatus of FIG. 1, the section being taken lengthwise thereof.

The present invention is particularly concerned with the fabrication and assembly of the porous and impermeable membranes to form a compact, efficient and inexpensive multiple effect still in which shallow passages are provided between adjacent membranes for conducting and permitting the free flow of liquids constituting the evaporating and condensing layers [of] *or* sheets. Reference is now made to FIGS. 1 through 3 of the drawings wherein there is illustrated a multiple effect still embodying the invention. For purposes of clarity of illustration, many of the dimensions of the elements, particularly thickness, have been exaggerated or otherwise shown distorted out of proportion. The still comprises a multiplicity of [flat] porous membranes 10 and impervious barrier membranes 12 assembled together in alternating stacked contiguous relation between a pair of header plates 14 and 16. The porous and barrier membranes are preferably rectangular in shape and substantially coextensive with one another, and the header plates are located on opposite sides, i.e., top and bottom, of the stack of films, are also rectangular and extend beyond the edges of the stack of membranes. Header plates 14 and 16 function to retain the stack of membranes together as an assembly and are formed with through holes 18 near the end and longitudinal edges to accommodate bolts 20 for clamping the stack of membranes between the header plates under compressive pressure at the margins of the [films] *stack*. In an alternative embodiment, the header plates may be constructed (e.g., in the form of frames) to apply compressive pressure only to the margins of the stacks and thereby perform their basic function of preventing escape of liquids at the edges of the membranes.

In the form of still shown, the membranes and header plates are generally planar and although they still may be operated in substantially any position or in a zero gravity environment, it is preferably oriented with the membranes, header plates, and layers of evaporating and condensing liquids disposed in horizontal planes. The assembly comprises, in order, an upper header plate 14, an impervious membrane 12, a multiplicity of porous membranes 10 arranged in alternating, repetitive order, and impervious membranes 12 terminating in an impervious membrane, and a lower header plate 16. The porous and barrier membranes cooperate to form shallow channels of depths of the order of the thickness of the porous membranes, through which the liquids comprising the evaporating and condensing layers are circulated. In the form of still shown, heat is transferred to lower header plate 16 and transferred from upper header plate 14 so that in operation, the feed liquid (e.g., salt water) is introduced between the underside of each porous membrane and the upper surface of the adjacent barrier membrane, and the product (e.g., potable water) is withdrawn from the channels between the upper surfaces of the porous membranes and the adjacent barrier membranes. Any suitable means of a type well-known in the art may be employed to transfer heat to and from the appropriate header plates including, for example, employing the feed liquid, either directly or by a heat exchanger, to cool the upper header plate, and solar energy, either directly of by a heat exchanger, to apply heat to the opposite side of the stack of sheets.

Figure 5:
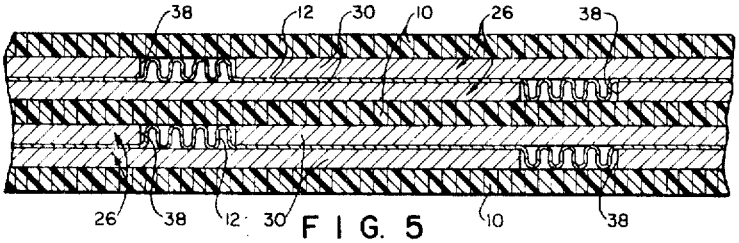
FIG. 5 is a fragmentary sectional view of components, including membranes, of the apparatus taken substantially along the line 5—5 of FIG. 4.
Figure 6:
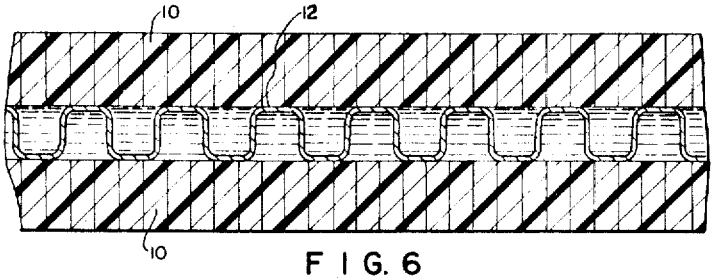
FIG. 6 is an enlarged sectional view showing in detail the construction of the apparatus.
Figure 7:
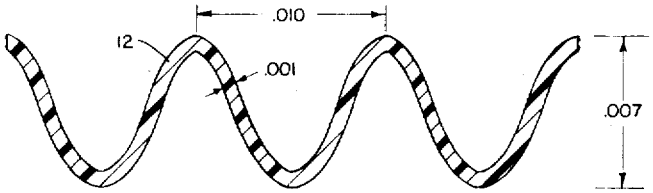
FIG. 7 is an enlarged sectional view similar to FIG. 6, illustrating other components of the apparatus.

Impervious barrier membranes 12 are designed both to separate the evaporating and condensing liquid layers, to physically space apart porous membranes 10 to provide the channels containing the liquids comprising the condensing and evaporating layers, and direct the flow of the liquids within the various layers thereof. Barrier membranes 12, shown in detail in FIG. 7, are preferably very thin having a thickness of the order of .0010", and in order to support adjacent porous membranes apart from one another to provide the requisite channels for the liquids, the impervious barrier membranes are corrugated so as to have a generally sinusoidal profile. In the embodiment of the still illustrated in the drawings, and particularly in FIGS. 5 and 6, designed for desalinating water, incorporating porous membranes 10 having a thickness of approximately .0060" and designed to operate with evaporating and condensing layers of a thickness of the order of .0050", the corrugated barrier membrane may have a sinusoidal profile with a corrugation width, (i.e., wavelength) of approximately .0010" and a corrugation height (i.e., amplitude) of approximately .0070" prior to assembly in the still (see FIG. 7). When assembled as part of the still, the corrugated barrier membranes are compressed slightly as shown in FIG. 6, to provide adjacent, parallel channels on opposite sides of the barrier membrane for conducting the liquids constituting the evaporating and condensing layers.

Although gross heat transfer is from the bottom to the top of the stack of membranes in a direction generally perpendicular to the planes of the membranes, heat transfer [from] *between* the product comprising a condensing layer contained in a channel designated 22, [to] *and* the feed liquid constituting the adjacent evaporating layer in a channel 24, is both horizontal or parallel with the planes of the layers, as well as vertical or perpendicular to the planes of the layers. It will be apparent that the sinusoidal configuration of the barrier membranes operates to increase the area of each barrier membrane in contact with adjacent condensing and evaporating layers so that heat transfer from adjacent condensing and evaporating layers is improved. The corrugated configuration of the barrier membranes provides a strong structure, highly resistant to compression for insuring that the passages [to], through which the liquids constituting the condensing and evaporating layers *flow, remain open so that the liquids* can flow freely in opposite directions despite differences in the hydrostatic pressure of the liquids in adjacent layers. In the assembly of membranes comprising the still, the corrugations and the channels provided thereby, extend from end to end of the assembly in generally parallel relation so that flow of the liquids comprising the condensing and evaporating layers is lengthwise of the assembly.

The still includes means for feeding a liquid such as salt water to the proper channels to provide the evaporating layers; withdrawing the product liquid, e.g., potable water, from the channels containing the condensing layers; and withdrawing the effluent, e.g., concentrated salt water, from the channels containing the evaporating layers. These same means also provide for sealing the assembly of stacked membranes to prevent leakage of the liquids and in the form shown comprise a plurality of rectangular gaskets 26, generally coextensive in size and shape with the porous and barrier membranes. Each gaskets 26 is in the form of a frame having relatively narrow lateral portions 28, and relatively wide end portions 30. Gasket 26 is disposed between each barrier membrane and the adjacent porous membrane so that the order of membranes and gaskets in the assembly is a barrier membrane 12, gasket 26, porous membrane 10, gasket 26, and barrier membrane 12. The assembly of membranes and gaskets is clamped between the header plates so that the lateral and end portions of the gasket, and the end and lateral marginal portions of the porous and barrier membranes are under compression sufficient to block or obstruct the channels and prevent escape of the liquids from between the membranes and gaskets at the edges thereof. The end portions of the porous and barrier membranes and gaskets are provided with holes 32, similar to and aligned with holes 18 in the header plates for accommodating bolts 20.

Figure 4:
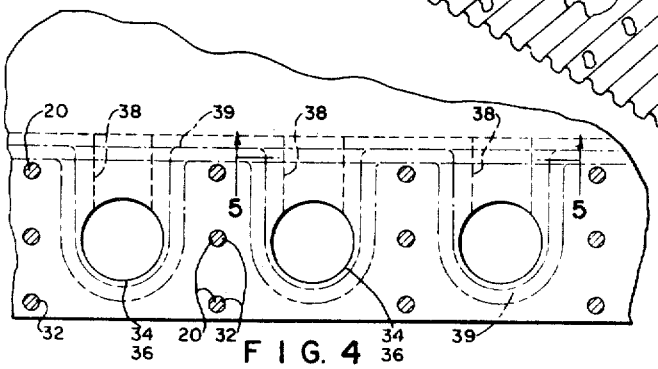
FIG. 4 is a fragmentary plan view, partially in section, of a portion of the apparatus.

In order to provide for introduction and withdrawal of the liquids constituting the evaporating and condensing layers, the end portions of the porous and barrier membranes, and end portions 30 of the gaskets 26, are formed with aligned circular holes 34, and header plate 14 is provided with similar circular holes 36 also aligned with holes 34. The compressive pressure on the end portions of the membranes and gaskets is sufficient to flatten, at least partially, the corrugated barrier membranes and prevent leakage into or from the conduits, defined by holes 34 and 36, between the various membranes. To provide for introduction of the appropriate liquid from a conduit defined by holes 34 between the proper porous and barrier membranes, slots or channels 38 are provided in end portions 30 of the gaskets extending from holes 34 through the inner edge of the end portions of the gaskets. The corrugations of the barrier membranes extend into channels 38 where they are engaged without being compressed between the end portions of the gaskets and the membranes and remain substantially in their extended condition (as shown in FIG. 5) within the channels between adjacent porous membranes and gaskets to maintain the channels in an open position on the appropriate sides of the barrier membranes. A suitable adhesive or sealant may be employed between the membranes and gaskets to further insure retention of the membranes together as a unitary assembly, prevent leakage at the gaskets and fill the corrugations in one side of each barrier membrane in each channel 38. In the embodiment of the invention shown in FIG. 4, a flexible sealant or gasket material such as a silicone rubber, may be applied as a continuous bead, designated 39 on each side of the end portion of each gasket in a zigzag pattern so as to form a flexible seal or gasket filling and blocking the corrugations so as to isolate openings 34 on opposite sides of the gasket from the outer and inner edges of the end portion of the gasket and from openings 32 to confine the liquid to the conduits defined by openings 34, except where it is intended that the liquid flow from the openings through appropriate channels 38. In still another embodiment of the apparatus, the beads of flexible sealant material, i.e., silicone rubber, may be applied directly to the membranes in sufficient thickness and arranged so as to perform the functions of the gaskets, namely blocking or obstructing the channels formed by the corrugations and sealing the spaces between membranes at the lateral margins thereof, thus providing for a simple and inexpensive method of fabricating and assembling the structure. In other words, the beads of sealants would extend continuously throughout the end and lateral marginal portions of the membranes and around openings 34 therein except openings through which liquids are intended to flow from condensing and evaporating liquid channels 22 and 24.

The liquids are introduced into and withdrawn from the still through suitable means such as manifolds 40 and 42 mounted on header plate 14 at opposite ends thereof. In the preferred form of the still shown in the drawings, the feed liquid or influent is introduced at one end thereof, the effluent is drawn off at the opposite end, and the product liquid is extracted from the still at the same end as the feed liquid is introduced so that flow of the feed and product liquids constituting the evaporating and condensing layers is in opposite directions. Accordingly, the end portions of the gaskets at the end of the still at which the feed liquid is introduced and the product liquid is withdrawn, are provided with slots or channels 38 extending from the inner edge of the end portion to every other hole 34, and the gaskets are arranged so that the slots in every other gasket are aligned, i.e., the slots in adjacent gaskets are staggered. The feed liquid is introduced through the conduits formed by every second hole 34, and the product liquid is withdrawn through the conduits, defined by alternate holes 34 located between holes through which the feed liquid is introduced. In this manner, the liquid layers located on opposite sides of each barrier membrane comprise the different liquids constituting the evaporating and condensing layer. At the opposite end of the assembly from which the effluent is withdrawn, holes 34 and 36 are fewer in number since the quantity of effluent is less than the quantity of feed water, and only those holes 34 in the gaskets having slots 38 through which the feed water is introduced, are provided with slots 38 for forming channels through which the effluent is withdrawn.

The feed liquid or influent, e.g., salt water, is introduced through manifold 40; the product liquid, e.g., fresh water, is withdrawn through manifold 40; and the effluent e.g., concentrated salt water, is withdrawn from manifold 42. Manifold 42 is quite simple comprising a block bolted to header plate 14 in covering relation to holes 36 in one end of the header plate, and having a longitudinal channel or recess 44 opening toward the header plate and communicating with holes 36. Manifold 40 is a double manifold inasmuch as it must deliver different liquids to and from alternate holes 36 at one end of the header plate 14. Manifold 40 comprises a block having two longitudinal channels, designated 46 and 48, defined by outer side walls 50 and end walls 52 and separated by a medial wall 54. The medial wall is designed to extend across and in closing relation to [walls] *holes* 36 in the header plate and the side and medial walls are provided with holes 56 aligned with holes [32] *18* in the header plate for receiving bolts 20. Channels 46 and 48 communicate with openings in an end of the manifold in turn coupled to suitable conduits designated 58 *and 60*, for delivering liquids to and from the channels. Medial wall 54 is formed with a plurality of delivery recesses or passages [60] *62*, each positioned for alignment with a hole 36 in the header plate and with adjacent delivery passages [60] *62*. Adjacent passages [60] *62* open in opposite directions into channels 46 and 48 so that every other delivery passage provides a conduit from one of channels 46 to 48 to the appropriate holes 36 in the header plate when the manifold is secured to the header plate in proper position. An appropriately formed gasket may be provided between the facing surfaces of the manifold and header plate to prevent leakage of the liquids therebetween.

Figure 8:
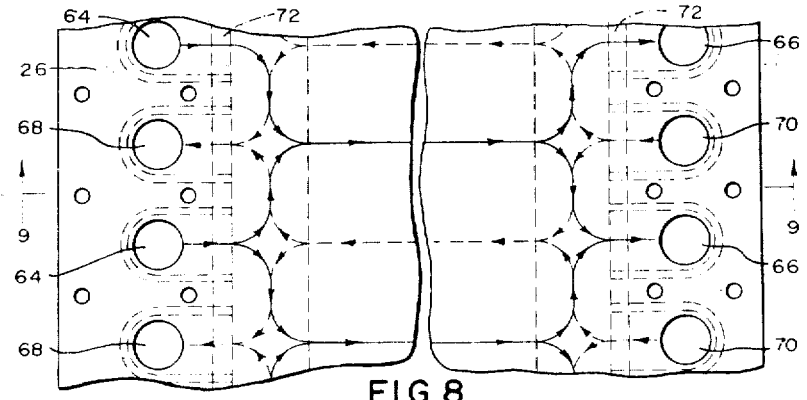
FIG. 8 is a fragmentary plan view similar to FIG. 4 illustrating the construction and operation of another embodiment of the apparatus.

FIG. 8 of the drawings illustrates the flow patterns of the distillate and distilland liquids through the still. It will be noted that the distilland liquid is introduced into the still between the membranes through alternate conduits 64 formed by openings 36 in the membranes and gaskets and flows, as shown by the solid lines and arrows, toward the opposite end of the still from which it is withdrawn through alternate conduit 66 formed by openings 36 in the membranes. The distillate liquid flows through the channels provided by the corrugated membrane in a direaction opposite to the direction of flow of the distilland liquid through the channels provided in the membrane, as shown by the broken lines and arrows in FIG. 8, and is withdrawn from the still through alternate conduits designated 68 disposed between conduits 64. In the copending U.S. application of Franklin A. Rodgers, Ser. No. 531,463, filed Mar. 3, 1966, a still is disclosed shown similar to that of the present invention in which manifold 42 is a double manifold similar to manifold 40, and distillate liquid is reintroduced into the still through conduits 70 formed by holes 36 located between conduits 66. It will be apparent from the flow diagram shown in FIG. 8 that the distillate and distilland liquids, immediately upon introduction into or immediately prior to withdrawal from channels between adjacent membranes, are required to flow transversely of the [chanels] *channels* formed by the corrugations. In other words, each liquid, upon entering by way of conduit 64 or 70, is immediately distributed laterally so as to fill all of the channels, formed by the corrugations through which the liquid than flows toward the opposite end of the still where it again flows laterally and is withdrawn through the appropriate conduits 66 or 68. Although lengthwise flow of the distillate and distilland liquids through the channels formed by the corrugations is in opposite directions, lateral flow of the liquids near the ends of the still is in the same direction.

Figure 9:
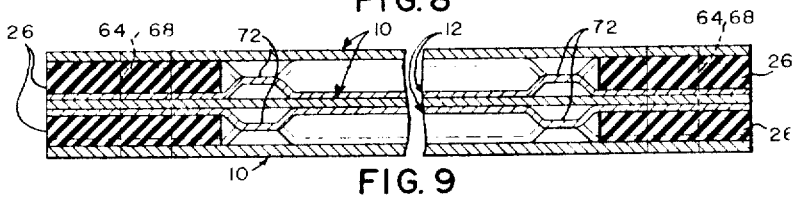
FIG. 9 is a sectional view taken substantially along the line 9—9 of FIG. 8.
Figure 11:
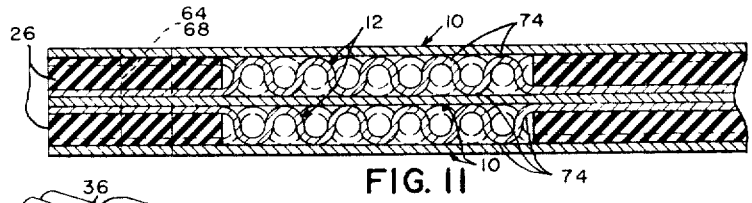
FIG. 11 is an enlarged, fragmentary sectional view of a portion of the still embodying the membrane shown in FIG. 10.
Figure 10:
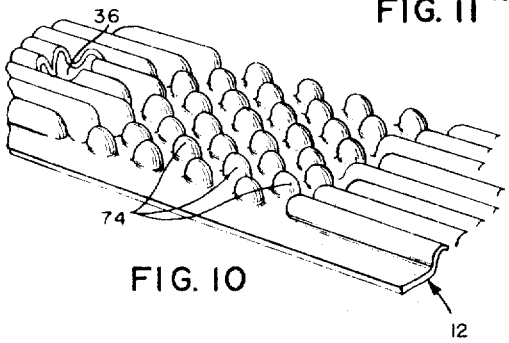
FIG. 10 is a fragmentary perspective view showing another embodiment of a component of the still.

In order to promote the lateral flow of the liquids and faciliate distribution and collection of the liquids at the opposite ends of the still, portions 72 of the corrugated membranes immediately adjacent gaskets 26 are not corrugated and remain planar or flat, as shown in FIG. 9, or are embossed in the form of dimples, as shown in FIGS. 10 and 11. By virtue of this construction, lateral flow of the liquids transversely to the direction of flow through the channels provided by the corrugations, is facilitated so as to appreciably reduce both the energy required to circulate the liquids and the likelihood of formation of deposits of the solute and/or minerals contained in the distilland solution. The uncorrugated areas of the impermeable membranes against which there is parallel (i.e., in the same direction) flow of the liquids constitutes a relatively small area of the membranes near the ends thereof, which area is of a size designed to conduct the quantity of liquid required to flow laterally from or towards the conduits through which the liquids are introduced and withdrawn.

The dimples, designated 74, shown in FIGS. 10 and 11, function in the nature of channels extending in both directions providing for both lateral and lengthwise flow of the liquid while serving to space the porous membranes apart from one another and prevent the channels for lateral liquid circulation from closing.

It will be apparent from the foregoing that the construction, in accordance with the invention, of the still and the various membranes comprising the still is such that the membranes may be formed rapidly and inexpensively by mass production methods and assembly of the membranes and gaskets to form the multiple effects still is equally simple and easily accomplished. This construction provides for excellent heat transfer and liquid flow characteristics contributing to a high degree of efficiency.

Since certain changes may be made in the above apparatus without departing from the scope of the invention herein involved, it is intended that all matter contained in the above description shall be interpreted as illustrative and not in a limiting sense.

What is claimed is:

1. Distillation apparatus comprising, in combination:

a plurality of [flat] *generally planar,* porous, polymeric membranes having pores containing substantially only gas and being substantially impermeable to a vaporizable liquid for passing substantially only gases including the vapor of said vaporizable liquid;

a plurality of *generally planar* barrier membranes impermeable to said liquid and vapor;

said porous and barrier membranes being arranged in alternating, face-to-face, stacked, contiguous relationship throughout the stack;

said barrier membranes being corrugated to provide channels between said [flat] porous membranes for holding and circulating liquids, the corrugations arranged in a single direction;

means for circulating a distilland through some of said channels in contact with the sides of said porous membranes facing in one direction toward one side of the stack of said membranes;

means for [circulating] *withdrawing* a distillate [through] *from* others of said channels in contact with the opposite sides of said porous membranes facing the other side of said stack of membranes; *and*

[means at said one side of said stack of membranes for transferring heat thereto: and means at said other side of said stack of membranes for transferring heat therefrom.]

*means for establishing a thermal gradient across said stack of membranes.*

2. Distillation apparatus as defined in claim 1 including gaskets engaged between said porous membranes and said barrier membranes adjacent the margins of said membranes [and means for retaining said gaskets and said margins of said membranes in compression] to prevent flow of said liquid and vapor from between said membranes and said gaskets.

3. Distillation apparatus as defined in claim 1 wherein [at least the end portions of] said membranes [are] *include end portions* disposed in generally parallel planes, said end portions include aligned openings cooperating to form conduits for *at least one of* said liquids extending normally to the planes of said membranes and said corrugations of said barrier membranes extend in generally parallel relation between said end portions.

4. Distillation apparatus as defined in claim 3 including gasket means engaged between said end portions of adjacent porous and barrier membranes *and wherein conduits are formed for two of said liquids*;

said gasket means including openings aligned with said openings in said end portions for preventing escape of said liquids from said conduits between said membranes and selectively directing *one of* said liquids from said conduits into said channels between appropriate pairs of said membranes; and means for [circulating] *introducing and withdrawing* said [first] *distilland* and [second] *distillate* liquids *respectively* through alternate conduits at one end of said [apparatus] *stack of membranes.*

5. Distillation apparatus as defined in claim 4 wherein said gasket means block said channels provided by said corrugations in one side of each of said barrier membranes in the region of alternate openings to prevent flow of one of said liquids from said conduits, formed by said alternate openings, in contact with said one side of each of said barrier [membarnes] *membranes*;

said gasket means block said channels provided by said corrugations on the opposite side of each of said barrier membranes in the regions of the remaining openings to prevent flow of the other liquid therefrom in contact with said opposite side of said each barrier membrane; and said corrugations remaining unblocked by said gasket means providing channels between adjacent porous and barrier membranes communicating with said conduits for conducting said liquids therefrom between adjacent porous and barrier membranes.

6. Distillation apparatus as defined in claim 3 wherein said barrier membranes include transverse portions immediately adjacent said end portions shaped to provide channels, extending transversely of said corrugations and communicating with said conduits and said channels formed by said corrugations, for conducting said liquids transversely of said corrugations between said membranes.

7. Distillation apparatus as defined in claim 6 wherein said transverse portions of said barrier membranes are [generally planar] *free of corrugations.*

8. Distillation apparatus as defined in claim 6 wherein said transverse portions of said barrier membranes are dimpled.

References Cited

The following references, cited by the Examiner, are of record in the patented file of this patent or the original patent.

UNITED STATES PATENTS

| | | | |
|---|---|---|---|
| 2,386,826 | 10/1945 | Wallach et al. | 202—236 X |
| 2,758,083 | 8/1956 | Van Hoek et al. | 210—23 X |
| 3,060,119 | 10/1962 | Carpenter | 210—22 |
| 3,129,146 | 4/1964 | Hassler | 202—172 X |
| 3,240,683 | 3/1966 | Rodgers | 202—173 |
| 3,340,186 | 9/1967 | Weyl | 203—11 X |

NORMAN YUDKOFF, Primary Examiner

D. EDWARDS, Assistant Examiner

U.S. Cl. X.R.

202—190, 235, 236; 203—10